United States Patent

[11] 3,574,469

| [72] | Inventor | Howard J. Emerson<br>Rochester, N.Y. |
|---|---|---|
| [21] | Appl. No. | 706,213 |
| [22] | Filed | Jan. 23, 1968 |
| [45] | Patented | Apr. 13, 1971 |
| [73] | Assignee | Eastman Kodak Company<br>Rochester, N.Y.<br>Continuation-in-part of application Ser. No. 374,990, June 15, 1964. |

[54] FAULT-DETECTING SURFACE SCANNER USING A LASER LIGHT SOURCE
1 Claim, 4 Drawing Figs.

[52] U.S. Cl. ......................................... 356/200,
178/7.6, 250/219, 356/160
[51] Int. Cl. ........................................... G01n 21/16
[50] Field of Search........................................... 356/158,
160, 199, 200; 250/219 (Web), 219 (F), 219 (DF), 219 (WD); 178/(Permutated "Laser" Publication Titles, Inquired); 178/7.6

[56] References Cited
UNITED STATES PATENTS
2,719,235  9/1955  Emerson ..................... 356/200X

| 3,019,972 | 2/1962 | Strother | 250/219WebX |
|---|---|---|---|
| 3,316,348 | 3/1967 | Hufnagel et al. | 178/7.6X |
| 3,349,174 | 10/1967 | Warschauer | 178/7.6 |
| 3,358,081 | 12/1967 | Young et al. | 178/7.6X |
| 3,379,832 | 4/1968 | Judin | 178/7.6 |
| 3,349,174 | 10/1967 | Warschauer | 178/7.6 |
| 3,436,546 | 4/1969 | Derderian et al. | 178/7.6X |
| 3,154,371 | 10/1964 | Johnson | 331/94.5UX |

OTHER REFERENCES
German Printed Application: 1,154,656, May 1961, Lentze, 250/219Df print FIG. 1 and abstract
Schawlow et al. Physical Review, Vol. 112, No. 6, Dec. 15, 1958 pp. 1940— 45 and 49.

*Primary Examiner*—James W. Lawrence
*Assistant Examiner*—C. M. Leedon
*Attorneys*—Walter O. Hodsdon, Paul R. Holmes and Robert L. Randall

ABSTRACT: A high speed optical fault-detecting surface scanner apparatus utilizing a laser light source which detects faults appearing on the surface of a relatively wide web driven past an inspection station at high speeds.

PATENTED APR 13 1971 3,574,469

HOWARD J. EMERSON
INVENTOR.

BY R. Frank Smith
David P. Ogden
ATTORNEYS

FAULT-DETECTING SURFACE SCANNER USING A LASER LIGHT SOURCE

This application is a continuation-in-part of Applicant's copending application Ser. No. 374,990, filed Jun. 15, 1964.

BACKGROUND OF THE INVENTION

In the art of surface scanners several arrangements have been developed in which a light beam is reflected toward a photodetector from the surface of the material, i.e., a web, being scanned. Such photodetectors may generate signals to mark a defective area of the web, or to control a sorting device to reject defective portions when the web is chopped into marketable size sheets. Usually this type of scanning detector is arranged to sense discontinuities in the web surface which change the reflectance of the surface. In such scanners a low incidence angle beam, with respect to the web surface, has been most useful to detect small surface irregularities. A higher angle of incidence has been impracticable because of limitations in the intensity of light sources.

In attempting to scan webs of substantial width, one of the most practicable approaches has been to use a flying spot scanner wherein several beams of light, each covering adjacent portions of the web across the width thereof, are directed repeatedly along parallel contiguous lateral areas of the moving web and are reflected to one or more photodetectors. When several light beams and/or detectors are used, maintenance problems result because of the necessity of balancing the light sources and the output of each of the detectors to achieve a uniform response across the web. In prior art devices using a single light beam and/or photodetector, the optical system necessary to focus the flying spot becomes relatively complex and expensive. Even so, the width of scanning which is practicable utilizing only a single light beam is only about 15 inches.

A particular problem in prior scanners of this type is to use a relatively narrow sweep angle (the angle traversed by the light beam as it travels from one edge of the web to the other) and yet to sweep a surface having a substantial width. Although telecentric scanning is in many ways preferably, as a constant angle of scan provides a uniform response to similar defects, a narrow sweep angle provides substantially such a uniform response. Such a narrow sweep angle requires the length of the base line to be relatively long compared to the width of the web being scanned. Thus the sweep-developing mirror system is spaced from the web a substantially greater distance than the width of the web. However, as the base line is increased, the scanning spot, which is in fact an image of the light source, tends to be enlarged. Inasmuch as small defects do not greatly affect the reflectance of a large spot, a small scanning spot results in most meaningful signal information.

With the incandescent light source of the prior art systems, the beam must be focused close to the objective lens so as to obtain an acceptably small scanning spot. However, to achieve an acceptable width of web scanning, and still retain the narrow scan angle, the distance from the web surface to the collimator lens, adjacent the sweep-developing mirror, must be about equal to the distance from the collimator lens to the focus point of the objective lens. It will be apparent that, to achieve even the 15 inch scanning width of the prior art scanners, the light beam greatly enlarges from the objective focus point to the collimator lens, requiring a large, complicated and expensive collimator. For example, one such collimator of prior arrangements has a diameter of 10 inches. Conversely, if economies are attempted in the size of the collimator, the scanning point would be either significantly reduced in intensity or would be of much greater size, either of which would substantially reduce the effectiveness of the inspection of the web surface for defects. Moreover, the useful scanning width would still be limited to approximately 15 inches.

It will thus be seen that the width of surface that can be scanned by prior art incandescent light scanners is self-limiting. The system cannot be enlarged without increasing power requirements and component size beyond practicality. Conversely, the component complexity and cost cannot be reduced without sacrificing the effectiveness of the defect detector.

Thus, it has not been heretofore practical to completely scan the full width of the relatively wide webs now being produced on high volume machines with a defect scanner arrangement employing only a single scanning beam. To scan the present wide webs it has been necessary to combine and balance several independent scanners, each covering only a portion of the web. When it is realized that each scanner so employed requires the complex, costly optical system referred to above, plus a sophisticated electronic discriminator, it will be appreciated that complete inspection of wide webs has nearly become economically unfeasible with such prior art scanners.

Since it has been found that there is no simple lens arrangement which will compensate for the fact that incandescent light sources are finite in size and limited in radiant energy generated per unit area the defect scanning arrangements of the prior art have not been able to keep pace with increased production requirements. The development of a conventional light source of sufficient intensity to attain a very narrow band of transmitted frequencies by filtering has been found to be impractical because of the heat, power and optical requirements of the system.

However, with the advent of the maser, a substantially simpler scanning arrangement has been found to be practicable. A maser, sometimes referred to as a laser, operates because of the characteristics of the various atoms used. Generally speaking, heating (often referred to as exciting or pumping) atoms causes their electrons to become more active and some of them to reside in larger energy levels. However, in each type of atom these levels are fixed in number and location. Also, some levels are stable and some are unstable. Usually, the lower, or unexcited, levels are stable and are referred to as ground states.

Neon by way of example, has 10 intermediate energy levels and will emit photons, seen as the characteristic reddish-yellow light, when electrons drop therefrom to a ground state. Sodium, often used in street lighting, emits a pronounced yellow light when electrons drop from an excited state to a ground state. These characteristic colors result from the energy distance between the several levels or state in which an electron may reside. Heating of atoms maybe accomplished in several ways, such as bombardment by a stream of electrons at a preselected energy level.

By way of example, one maser uses a mixture of neon and helium. A selected temperature (velocity) electron bombardment pumps the helium atoms to a very high "metastable" energy level from which they normally do not radiate energy in the form of photons. However, they rapidly transfer this energy to neon atoms through contact or collision. Such transfer raises the neon electrons to one of four high energy levels from which, on simulation by photons, they emit preselected infrared or visible red photon energy as they drop to one of their 10 intermediate energy levels.

Stimulating photons are maintained in the system by having the excited gases in a long tube provided with efficient reflectors at each end. The photon beam is reflected between the ends of this tube and stimulates enough excited neon atoms to increase the photon energy so that a portion of the photon beam may be drained off continuously for use elsewhere through the center of one of the reflectors. The mirrors in combination with the bombardment energy control the frequency (wavelength) of the photon beam developed. Such a photon beam is coherent and diverges such a small amount that it may be transmitted a substantial distance without much loss of intensity per unit area. Certain wavelengths of a maser are useful for scanning web surfaces, such as paper stock, metal coatings, plastics, glass and the like.

SUMMARY OF THE INVENTION

Accordingly, the present invention provides a fault-detecting arrangement for scanning the surface of a material with a flying spot beam of light generated by a source creating a substantially continuous, substantially nondiverging beam of coherent light. Means is provided for repeatedly deflecting the light beam transversely across the material surface. And a photodetector is arranged to receive at least a portion of the light beam after it is reflected from the surface and to respond to variations in the intensity of the reflected beam.

Moreover, the present invention provides a defect detector which, with only a single light beam, is arranged to such a relatively wide moving web with a narrow scan angle and substantially simplified optical components and related electronic equipment.

More particularly, the present invention provides a detector which utilizes a maser or laser light source to scan a web substantially wider than 15 inches while the web is maintained in a flat plane from edge to edge.

Specifically, the present invention provides a web scanner capable of effectively scanning for defects a moving web having a width greater than about 3 feet with a single beam of light and having an included scanning angle of less than about 30°.

Since the parallel beam energy of the maser source creates a light beam which is similar to one developed by an infinitely small point source, the size of the image compared to the "source" becomes relatively unimportant. As will become apparent from the following disclosure, the use of such a light source allows substantial simplification of construction and the number of components required for a scanning arrangement with a concomitant reduction in cost. Such a scanner system is more effective than prior art systems and is simpler and less expensive. Such a system may be designed a though it provides a point source of light with a greatly simplified lens system to reduce to a minimum losses and costs associated with the optical system.

Furthermore, with the intense light produced by the laser, a greater angle of incidence may be utilized which permits the detection of color changes or streaks or spots in the web which do not have a steeply rising edge. This increased intensity permits greater incidence angles despite the added losses because of increased scattering, etc.

The various features of novelty which characterize the present invention are pointed out with particularly in the claims annexed to and forming a part of this specification. For a better understanding of the invention, its operating advantages and the specific objects obtained by its use, reference should be had to the accompanying drawings and descriptive matter in which the preferred embodiments of the present invention are illustrated described.

DESCRIPTION OF THE PREFERRED EMBODIMENTS

Figure 1:
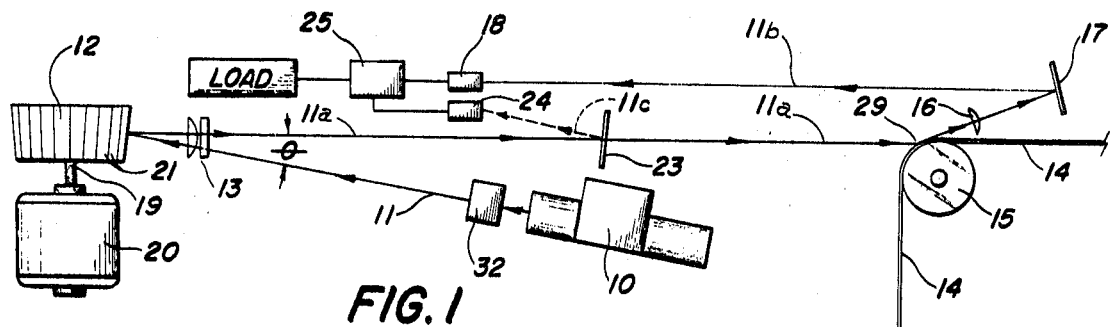
FIG. 1 is a schematic elevation view illustrating the configuration of a light beam used in accordance with a preferred embodiment of my invention.

Referring now to the drawing wherein like numbers relate to similar parts, FIG. 1 illustrates a maser or laser 10 arranged to direct a beam of light 11 toward a rotary multifaceted mirror 12 from which the light beam 11a is reflected toward a moving web 14. Both of the light beams 11 and 11a pass through a converging lens system 13. One arrangement of the lens system 13 is a pair of crossed condensing cylinder lenses arranged so that the beam 11a reaches the web 14 conveyed on a roller 15 with a readily controlled spot length and width. The signal-information-containing light beam is reflected from the surface of the web 14 through a cylindrical condensing lens 16 and is reflected by a concave cylindrical reflector surface 17 towards a photodetector 18. Because of the maser source, the divergence characteristics of the light beam are readily controllable. That is, the outer edges of the beam are quite parallel so that the intensity of the beam per unit area is substantially constant.

Figure 2:
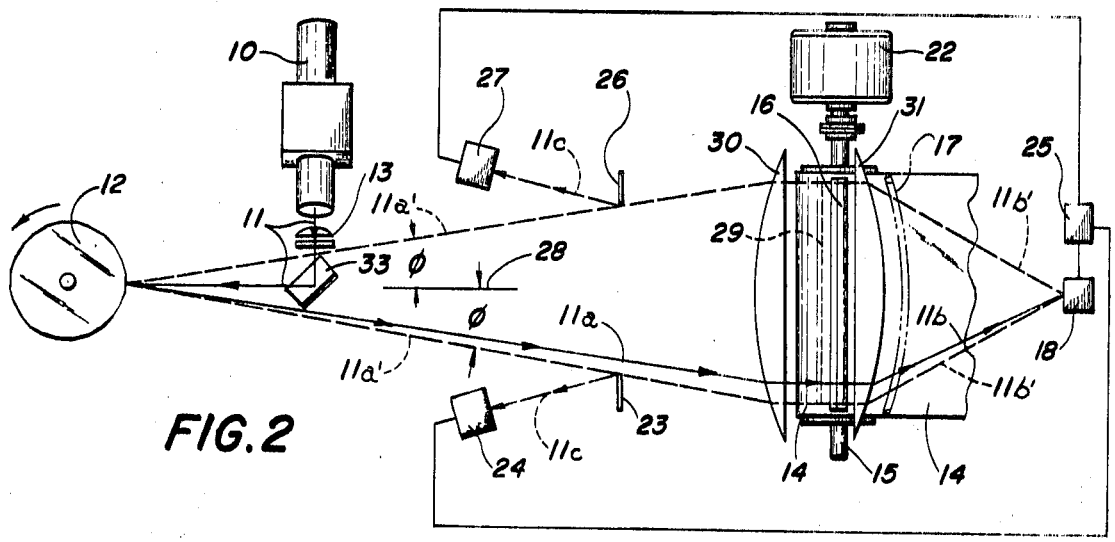
FIG. 2 is a schematic top plan view of a similar alternate embodiment of my invention.

The reflecting mirror 12 is generally cylindrical in shape and is formed of a plurality of flat mirror surfaces 21 disposed around the circumference. The mirror surfaces specifically illustrated are arranged at a slight angle to the axis of the drive shaft 19 so that the axis is perpendicular to the light beam 11a, while the mirror surfaces may receive the light beam 11 at an angle Θ and sweep the light in a plane perpendicular to the mirror axis. Thus, the laser light source 10 may be disposed beneath the path of light beam 11a, decreasing the amount of space required for the system. A motor 20 drives the mirror 12 so that each flat mirror surface 21 is sequentially receptive of the light beam 11 causing beam 11a to scan repeatedly across the web 14 (as indicated in FIG. 2).

The significant improvement of this system is somewhat difficult to appreciate without at least a partial understanding of similar apparatus of the prior art. The "flats" 21 of the present mirror 12 are about three sixteenths inch wide, while in the prior art mirror the flats are about 1½ inches wide. This is because, in prior art systems, it being impractical to attain sufficient per-unit intensity, it is essential to use larger mirror flats to provide a useful total intensity of light at the surface of the web. Because of the beam intensity available with the present arrangement the illumination of two flats requires a beam of only ½-inch width, compared to the prior art system which requires beam width of approximately 4 inches. As a result, the lenses of the prior art system, or at least some of them, had to be larger than a 4 inch light beam to permit the illumination of such large flats, and the lenses necessary to project the beam in the form of a small spot about 4 feet to a web cost many tens of thousands of dollars. Nevertheless, the web width which can be scanned at that distance is only about 15 inches with an acceptably narrow scan angle. Moreover, the larger size of the prior art mirror limits its speed of rotation because of the centrifugal forces which are imparted to such large rotating bodies. Thus the velocity of a web being scanned must be limited to that whereby all of the surface of the web may be scanned with the relatively slowly rotating mirror. Although three such systems have been combined to scan a web about 43 inches wide, the use of additional systems to provide a more rapid sweep become prohibitively complex and expensive.

On the other hand, with the present invention a much smaller mirror may be used which permits an order of magnitude increase of the sweep rate without damage to the mirror 12. As will be seen from the following discussion, a single system will scan a web having a width of 48 inches or greater without the necessity of additional systems and without severe limitations to the web velocity. Thus the driving velocity of the web 14, as by a motor 22 (FIG. 2) coupled to roller 15, may be substantially increased.

Also illustrated in FIG. 1 is a mirror 23 which reflects the light beam 11c (dashed lines) to a second photodetector 24. As illustrated more clearly in FIG. 2, the reflecting mirror 23 is energized only when the beam 11a is at one edge of the web such that it will not impinge upon the useful central portion of the web 14 being scanned. Thus the signal developed by the detector 24 is utilized in a gating circuit 25 to initiate passage of the signal from the detector 18 to a utilization load. A similar reflecting means 26 at the opposite edge of the web energizes a photodetector 27 to terminate receptivity of the signal from the detector 18. The mirrors 23 and 26 aRe placed equidistant from a base line 28 along the sweep boundaries 11a' (dashed lines) to detect the beam 11a as it approaches the edges of the web 14. Similar boundaries of the beam 11b are illustrated at 11b' in dashed lines. It will be appreciated that the present arrangement only requires a single pair of boundary detectors compared to the three pairs, previously required.

Other types of boundary detectors may be used such as photodetectors positioned in place of mirrors 23 and 26 and connected to the gating circuit 25. When using such a gating system, delay and wave-shaping circuits are used to place the desired signal information within the duration boundaries determined by the photodetector.

Also in the alternate embodiment illustrated in FIG. 2, the line of scan 29 is illustrated in dashed lines and the collector reflecting mirror is functionally replaced by a pair of cylindrical lenses 30 and 31 placed on both sides of the scan line 29. As another modification, the lens 30 may be omitted in which case lens 31 must be made more effective or the distance to the detector 18 must be increased. Similarly, the lens 31 may be replaced by the collecting mirror 17 as indicated in phantom lines in FIG. 2. Such replacement would result in the detector 18 being located as indicated in FIG. 1.

It is apparent that the system illustrated in FIG. 1 is folded twice, once by the rotating mirror 12 and again by the collecting mirror 17. Similarly, the system illustrated in FIG. 2 is folded once by a mirror 33 and again by the rotating mirror 12. If space requirements so dictate, the system may be folded several other times by other mirrors (not illustrated) so that it may actually be substantially smaller than the distances indicated in the schematic drawings. For the purpose of discussion, the length of the beam 11 may be considered to be about 6 feet. The length of the base line 28 of the beam 11a of the arrangement of FIG. 1 is about 12 feet and the length of 11b is about 8 feet. For scanning a 48-inch web, I prefer that the angle Θ be about 3° and the sweep angle Φ (FIG. 2) be about 9° between each of the boundaries 11a' and the base line 28, which corresponds to the angle between adjacent facets on the rotating mirror 12. Such a rotating mirror contains 40 facets, each having a width of approximately three-sixteenths inch, with a diameter of approximately 2.5 inches.

For the particular application illustrated, light beam 11a is in the infrared region and will not expose a photographic emulsion on the web 14, in this instance a photographic film, but will energize the photodetector 18 which may be one of several photodetectors presently on the market sensitive to infrared light having a wavelength of about 7600 angstroms. The gaseous laser referred to herein may also operate at a wavelength of 6328 angstroms, whereby the detector may include a S-20 photomultiplier tube. An injection diode may be operated at 9000 angstroms or at 11,530 angstroms with detectors including S-1 photodetectors.

In FIG. 1, an expander (or contractor) lens system 32 is shown for correcting the size of the beam supplied by the maser 10 to that required by the system. Light from the particular maser illustrated is substantially nondiverging, but is of a smaller diameter than that required to illuminate two flats of the mirror 12. The expander lens system 32 widens this narrow nondiverging beam and recreates a parallel beam of approximately ½-inch diameter. It will become apparent to hose skilled in this art that the expander lens system 32 may relatively easily provide a beam of about ¾-inch diameter whereby the condensing lens system 13 may be placed within or adjacent to the lens system 32. The expander lens system 32 is relatively simple and may be considered as a portion of the maser light source. Obviously, when a more complete selection of masers becomes available, the lens system 32 will not be needed or will take a different form as the maser having the proper aperture or a different type aperture will be used.

Figures 3, 4:
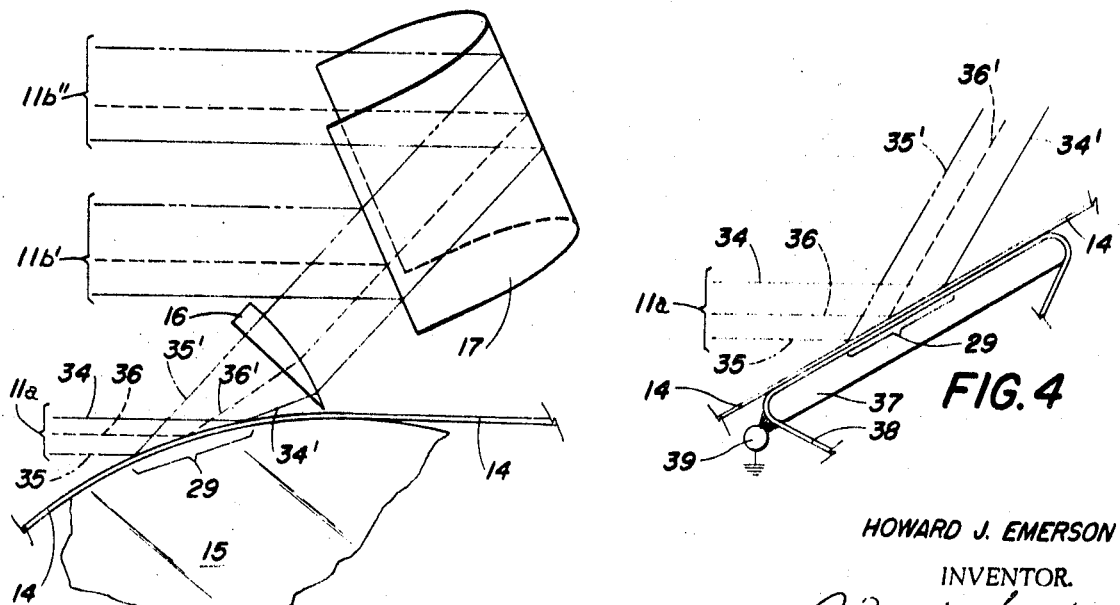
FIG. 3 is an enlarged detailed cross section of the scanning section of the light beam.
FIG. 4 is a cross section similar to that of FIG. 3 of another embodiment of my invention.

Referring now to FIG. 3, an enlarged view of the light beam 11a is illustrated as having a substantial width whereby an upper edge 34 thereof is spaced above the central portion 36 and the lower edge 35 thereof. In practice, this separation between the edges 34 and 35 may be of the order of one-sixteenth inch or more so that the beam's edges strike substantially different portions of the web 14 being conveyed over the roller 15. Thus one scan per one-sixteenth inch of web movement will provide signals representative of all surface portions of the web 14. The smaller light beam at the scan lines 29 results from the condensing lens 13 discussed above. Such a beam is substantially more intense as a function of an inverse ratio of the areas.

Because of the curvature of the roller 15, the several portions of the light beam 11a are reflected from the web surface at different angles and in reversed order as indicated by 34', 35', and 36'. By way of example, the roller 15 may have a diameter of 6 to 10 inches. Because of the difference in the angle of approach of the light beam to the curved surface, the beam tends to be dispersed and must be collected by the cylindrical condensing lens 16 to again provide a substantially columnar (nondiverging) light beam. Thus, the parallel light beam is directed against the mirror 17 to be reflected to the photodetector 18.

It is obvious from FIGS. 2 and 3 that because of the concave cylindrical curvature of the collecting reflector 17 the edges of the mirror 17 are substantially closer to the scan line 29 than the center thereof. As shown in FIG. 3, because of this and the fact that the beam is reflected at an angle, there is a substantial vertical distance between the light beams 11b' reflected from the edges of the reflector 17 and the light beams 11b'' reflected from the center of the reflector 17. To correct for this, I prefer to twist the edges of the mirror 17 to attain a more spherical configuration so that the lower beam 11b' is angled up compared to the projection of the beam 11b'' from the center of the mirror system.

Referring now again to FIG. 2, this problem is substantially eliminated by the use of the lenses 30 and 31 or the lens 31 by itself, because the flying spot, as it passes through the lens 31 is directed along a linear path so that the reflection from the web 14 remains in a flat plane trajectory through the collector lenses 16 and 31. Thereby any relative distance variations do not produce alignment problems.

With no problem of substantially different frequencies of light being involved in a maser light source, the achromatic or other color corrections necessary for a broad band light beam become unnecessary so that it is a relatively simple matter to focus the light beam on the light cell 18 at distances approaching 30 feet from the light source.

FIG. 4 illustrates another embodiment of the present invention wherein the roller 15 has been replaced by a flat bedplate 37. Although the flat bedplate 37 causes reflection of the beam (34', 35', 36') in parallel form, to eliminate the need for the cylindrical condensing lens 16, it is subject to the generation of static electricity and other problems and thus, in its simplest form, is not most feasible for all types of photographic film, paper, etc. Static electricity may be inhibited by the use of a sliding metal sleeve 38 which is continuously grounded by a conventional static eliminator 39.

It should be noted that such a system as indicated in FIG. 4 may be operated primarily with mirrors. With the use of the lens system 13 adjacent to the maser 10 and the mirror 17 no lenses need be placed between the mirror 12 and the detector 18. As is well known to the art of lenses, losses of a few percent of light intensity occur at each surface of a lens, because of reflection, etc. Thus the fewer lenses used in a system, the less such loss in light intensity. Although mirrors can result in somewhat equivalent losses, it is feasible to construct mirrors without transmission of light through glass. Such mirrors may be made with silver plating on top of glass or stainless steel etc. so that losses because of mirror reflections may be made less than losses of lens transmission.

It should be noted that the triangle formed by the boundaries 11 and the line of scan 29 (FIG. 2) is an isosceles triangle. The base of this triangle (scan line 29) is preferably a straight line and is, of course, in the plane of the scan pattern. Similarly, the scan line 29 of the flat surface 37 is a straight line forming a similar isosceles triangle with the boundaries 11a'. Other configurations have been found to unduly complicate the optics of the system.

Accordingly, it will be seen that the present invention provides a fault-detecting arrangement which permits high speed scanning of wide materials. Moreover, the present invention provides the scanning of wide materials with a much simpler arrangement than has been available heretofore while at the same time utilizing a more intense light spot which assures the detection of all defects occurring in the traveling web. Furthermore, the present arrangement is significantly improved in that the wide web material may be inspected utilizing an included scanning angle which is substantially less than 30°. In addition, the number and complexity of the electronic components necessary for the operation of the present system is substantially reduced from that required by prior art scanners. Thus, the cost of the system is materially reduced while the reliability is at the same time greatly increased.

The invention has been described in detail with particular reference to preferred embodiments thereof, but it will be understood that variations and modifications can be effected within the spirit and scope of the invention as described hereinabove and as defined in the appended claims.

I claim:

1. Apparatus for inspecting a moving web for surface defects with a single flying spot of light, said web having a width substantially greater than 15 inches, said inspection apparatus comprising a web inspection station, means for transporting a web past said inspection station, laser means for generating a continuous substantially nondiverging beam of coherent light, a rotating reflector having a diameter less than about 6 inches, said rotating reflector having a multiplicity of peripheral planar reflector surfaces each having a width less than about one-half inch arranged to reflect said beam of light towards said web at said inspection station and to sweep said beam across said web with an included scanning angle of less than about 20°, said rotating reflector being spaced from said web a distance greater than the width of the web and arranged to direct said light beam toward the surface of said web at an angle thereto whereby said beam is reflected from the surface of the web in a direction away from said rotating reflector, means for directing said beam reflected from the surface of the web to substantially a single point, and beam detector means disposed at said single point arranged to respond to the intensity of said beam reflected from the surface of said web.